No. 777,479. PATENTED DEC. 13, 1904.
J. W. MOAKLER.
ROLLER BEARING.
APPLICATION FILED AUG. 3, 1903.
NO MODEL.

WITNESSES:
Edward S. Hull
Archie Hall

INVENTOR
John William Moakler
BY
Daw Wron
ATTORNEY

No. 777,479.

Patented December 13, 1904.

UNITED STATES PATENT OFFICE.

JOHN WILLIAM MOAKLER, OF NEW YORK, N. Y.

ROLLER-BEARING.

SPECIFICATION forming part of Letters Patent No. 777,479, dated December 13, 1904.

Application filed August 3, 1903. Serial No. 167,965. (No model.)

*To all whom it may concern:*

Be it known that I, JOHN WILLIAM MOAKLER, a citizen of the United States of America, residing in the city, county, and State of New York, (and having a post-office address at No. 10 East Forty-second street in said city,) have invented certain new and useful Improvements in Roller-Bearings, of which the following is a specification, reference being had to the accompanying drawings, forming a part hereof.

My invention relates to that class of bearings in which relatively free rollers are utilized to reduce friction; and the object of my invention is to provide such a bearing in which friction will be greatly reduced and to provide features therein whereby the effects of severe strains and of wear will be eliminated to a greater extent than in bearings of the class described now in use.

While primarily intended as a vehicle-bearing, it is obvious that my invention is applicable in all shaft-bearings where its use will be of benefit.

Figure 1:
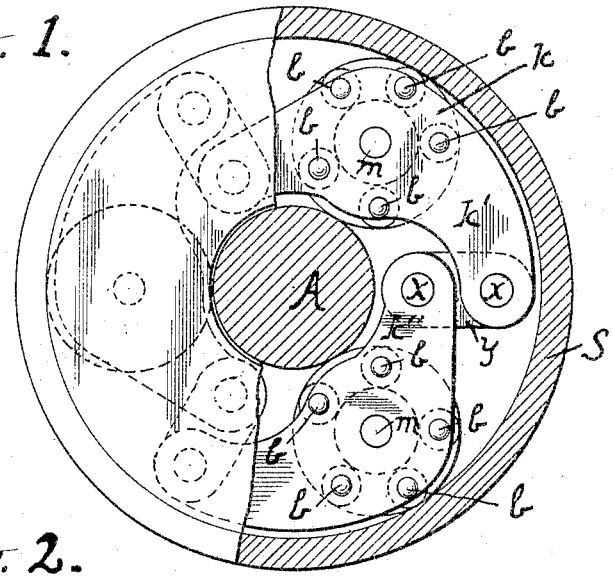
Figure 2:
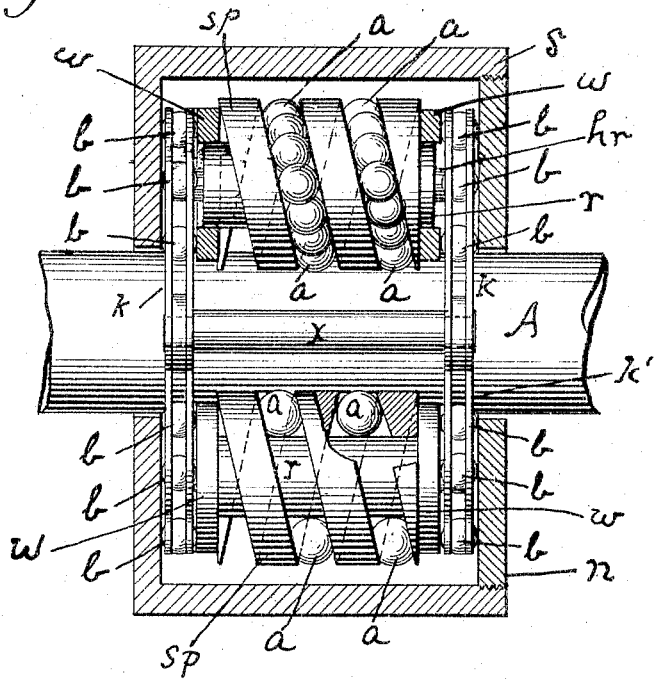

In the drawings, Figure 1 shows a bearing with half of the retaining-nut cut away; Fig. 2, a view of the bearing, showing the roller-spindles and with the retaining box or sleeve shown in section through the center line.

In my invention I make use of a number of rollers carried by a relatively flexible cage, the rollers embraced between the axle or shaft and the sleeve. Such rollers are free to revolve, being journaled between the respective ends of the cage and parallel to the axle.

In the drawings, A, Fig. 1, is an axle; S, the sleeve. $k$ is one of three roller-carrying links, shown in the figure disposed around the axle and connected together by short intermediate links, one of which is shown at $y$, Fig. 1, and the two others in dotted lines in the same figure. It will be noticed that each of the links $k$ of the cage has an outside lug $k'$, Fig. 1, and an inside lug $k''$, Fig. 1. The roller-carrying links are preferably made of thin metal sides (shown in Fig. 6) connected by a hub $h$, and bearing between such sides a series of balls $b\ b$, &c., such balls projecting through suitable openings in the sides of the links, as shown in Fig. 1. The roller-carrying ball-bearing links are connected to the intermediate short links $y\ y$, &c., by pins $x\ x$, &c., which extend from end to end of the cage, as shown in Fig. 6, so that the whole cage system is capable of expansion or contraction in diameter, but rendered rigid longitudinally. In Fig. 1 a retaining-nut $n$ is shown covering the left-hand side of the bearing. The nut being drawn only to cover half of the bearing, the upper right-hand ball-bearing link is shown in Fig. 1 with its balls projecting and forming a bearing-surface against the retaining nut or collar, as the case may be. The rollers consist of a spindle $r$, Fig. 2, having shoulder at $hr\ hr$ and bearing a series of balls between the turns of a spiral spring $sp$, having a cross-section larger at its outer surface. Washers $w\ w\ w\ w$, Fig. 2, the two upper of which are shown in section, fit loosely on the spindle $r$ and retain the spring $sp$ and the balls $a\ a\ a\ a$, &c. The rollers are journaled, respectively, between the ball-bearing roller-carrying links, the washers bearing against the inner surfaces of the link-carried balls, and the shoulders $hr\ hr$, allowing some freedom of longitudinal movement of the spindles. Normally the springs $sp$ are a part of the bearing-surface of the rollers, the outside surface of the springs being flush with the bearing-surface of the balls $a\ a$, &c.

It is obvious that upon wear of the axle the links composing the ends of the roller-cage from their flexibility can assume new positions and to an extent compensate the wear. Longitudinal strains upon the retaining-collars (the nut $n$, for instance, and the similar collar presupposed at the other end of the cage) will cause the springs $sp$, &c., to contract, thus forcing the springs out and by increasing the diameter of the rollers relieving the strain upon the roller-balls $a\ a$, &c. It will be noted that there is a ball-bearing for the ends of the rollers and a ball-bearing against the retaining-collars.

I am aware that rollers have been utilized before for bearings and in connection with balls, and I am also aware that spring-rollers have been used wherein the rollers consisted of simple spiral springs, whereby sudden shocks could be taken up; but in my invention I not only obtain the benefit of the springs, but provide a ball-bearing surface for the rollers, together with an effective means of taking up end thrust. It is obvious that in practice there will be many more balls $a$ $a$, &c., than as shown in Fig. 2, it being intended that there shall be a practically continuous series of balls between the turns of the springs, though the number may be decreased as expediency may require. A greater number of rollers than three may of course be used, three rollers being shown in the drawings merely for clearness, though it is obvious that five, for instance, would present distinct advantages over three.

While the opposite sides of the cage are held together by the rods $x$ $x$, &c., yet the cage is left free to revolve as a whole around the axle A. The cage is also flexible in so far as change in its diameter is concerned, and should the axle become smaller from wear the flexibility of the cage would permit two adjacent links, for example, to be separated to some extent, when the third link would be forced against the other side of the axle-box. It is of course impossible that wear of axle or box will be compensated in the sense of the cage becoming internally smaller or externally larger by expansion or contraction; but there is a compensation for wear possible by means of the flexibility of the relative members of the cage, as it can assume positions by means of which a more even distribution of strain can be had than with a rigid cage. While the cage as a whole is rigid longitudinally, yet the ball-carrying links are of thin metal and have a certain amount of flexibility between the connecting-rods $x$ $x$, &c., whereby longitudinal strain may be taken up on the springs. The roller-spindles are adapted to allow a certain amount of longitudinal play of the flexible links, so that upon compression due to end thrust the springs may be contracted and the spring-contained balls relieved to some extent of the strain.

It is obvious that in cases where there would be a considerable thrust upon the bearing a spring, such as a split-ring spring, might be used to advantage outside a false collar upon one end of the bearing where the thrust would be felt.

Having described my invention, what I claim is—

1. In a bearing of the class described, roller-spindles parallel with the axle, spiral springs encircling said spindles respectively, bearing-balls carried on said spindles between the turns of said springs, chains of connected links forming the ends of the bearing, said spindles being journaled between opposite links, substantially as set forth.

2. In a bearing of the class described, a cage formed at each end of the bearing of flexibly-connected links, roller-spindles journaled between opposite links, spiral springs encircling respective spindles, bearing-balls between the turns of said springs, and balls carried in the said links, substantially as set forth.

3. In a bearing of the class described, a cage formed by respective chains of flexibly-connected links at each end of the bearing, said chains connected by rigid longitudinal members, roller-spindles journaled between opposite links, spiral springs encircling respective roller-spindles, bearing-balls carried between the turns of such springs respectively, and balls at the outer ends of said cage, substantially as set forth.

4. In a bearing of the class described a cage formed of two closed chains of ball-carrying links connected by rigid rods parallel with the axle, a series of roller-spindles parallel with the axle and journaled between opposite links of said chains, spiral springs encircling respective spindles, and a series of bearing-balls for each of said spindles carried thereon between the turns of its respective spiral spring, substantially as set forth.

In witness whereof I have hereunto set my hand, this the 30th day of July, 1903, at New York, county and State of New York.

JOHN WILLIAM MOAKLER.

Witnesses:
HENRY SYLVESTER PREDMORE,
EDWARD S. HULL.